May 25, 1965
C. R. JOHNSTON
3,185,112
FREIGHT CAR CONSTRUCTION
Filed Aug. 11, 1961
2 Sheets-Sheet 1
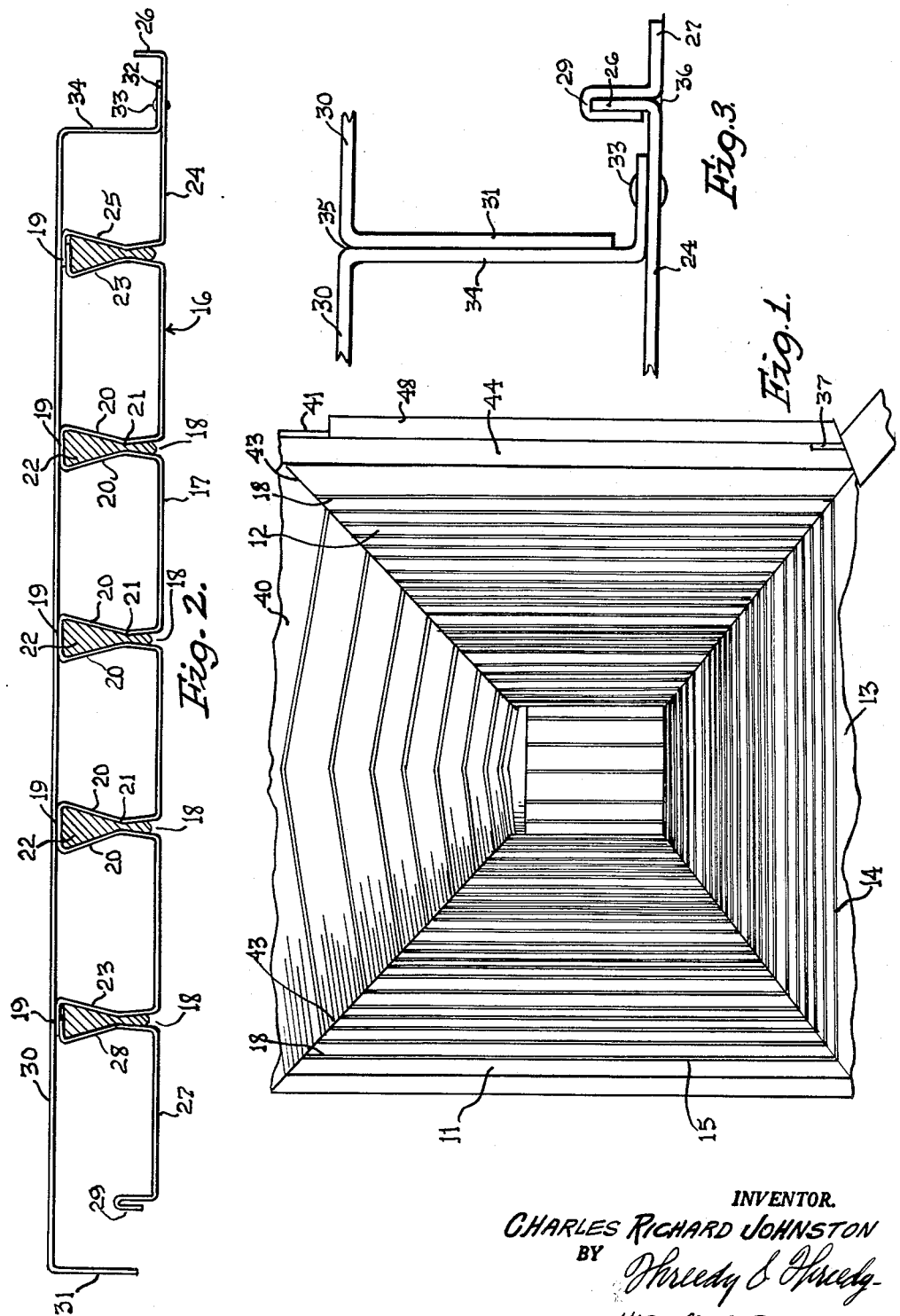
INVENTOR.
CHARLES RICHARD JOHNSTON
BY Shreedy & Shreedy
HIS ATTORNEYS.

May 25, 1965  C. R. JOHNSTON  3,185,112
FREIGHT CAR CONSTRUCTION
Filed Aug. 11, 1961  2 Sheets-Sheet 2
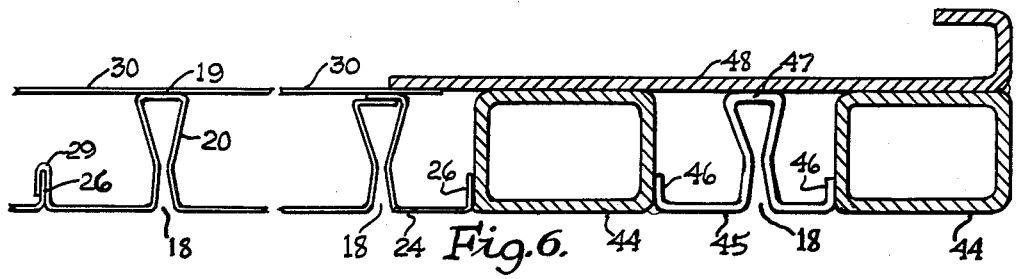
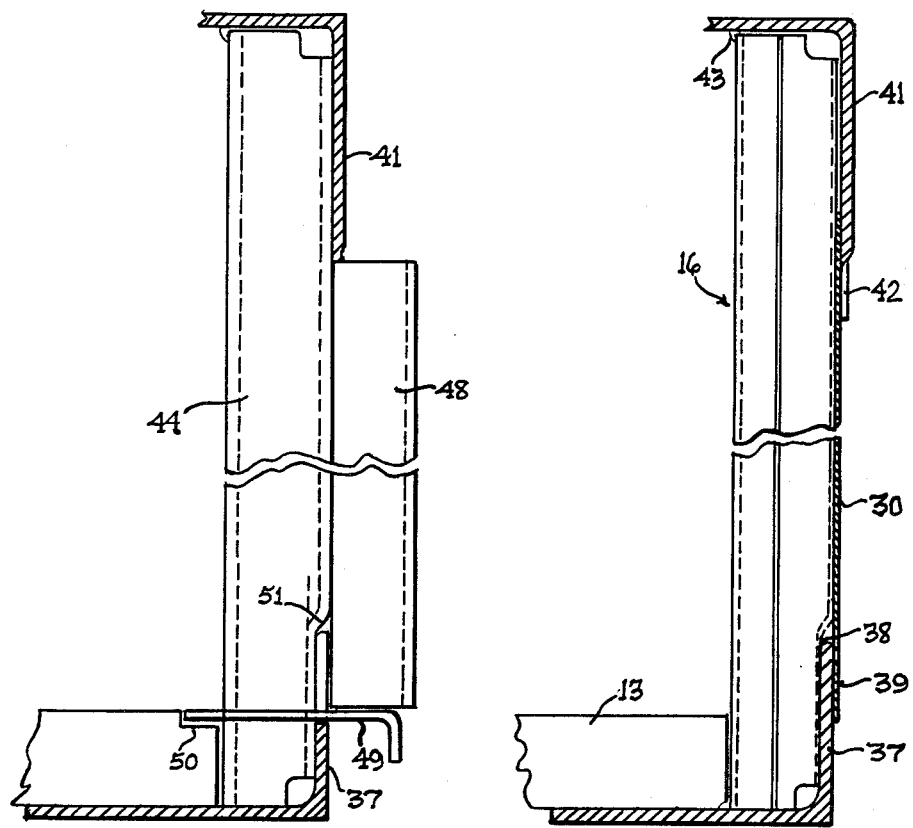
INVENTOR.
CHARLES RICHARD JOHNSTON
BY Threedy & Threedy
HIS ATTORNEYS.

… … …

United States Patent Office 3,185,112
Patented May 25, 1965

3,185,112
FREIGHT CAR CONSTRUCTION
Charles Richard Johnston, 80 E. Jackson Blvd.,
Chicago, Ill.
Filed Aug. 11, 1961, Ser. No. 130,890
4 Claims. (Cl. 105—409)

My invention relates to a new freight car construction and more particularly to a method of prefabricating a freight hauling vehicle such as a railroad freight car.

A principal object of my invention is in a freight car construction of this character of a means for inter-connecting prefabricated walls and floor sections together to form a metallic nailable self-supporting structure which is of minimum weight and cost yet consistent with the sturdiness required of freight hauling vehicles.

Another object of my invention is in the provision in a freight car construction of this character whereby wall portions are sectional prefabricated units which are self-supporting, eliminating the requirement of spaced vertically disposed support posts or the like.

A further object of my invention is in the provision in a freight car construction of this character whereby the walls and floor of the car comprise metallic nailable self-supporting units which by their unique configuration and adaptation are capable of withstanding varying degrees of stress and strain imposed thereon by the freight stored and transported therein.

Yet another object of my invention is in the provision in a freight car construction of this character of a doorway defining structure readily adaptable to be constructed together with the prefabricated nailable wall defining units.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a fragmentary perspective interior view of a freight car constructed in accordance with my invention.

FIG. 2 is a top plan view of one prefabricated nailable wall section of my invention.

FIG. 3 is a fragmentary plan view of the structure comprising the means of inter-connecting each of the prefabricated wall sections together.

FIG. 4 is a fragmentary side elevational view of the parts comprising the door-defining structure of my invention.

FIG. 5 is a fragmentary side sectional elevational view of one side wall of the freight car constructed in accordance with my invention, and FIG. 6 is a fragmentary top plan sectional view of the door-defining arrangement of my invention.

This invention describes a new form of freight car construction in which the normally required structural framework comprising spaced apart vertically disposed wall supporting posts are eliminated.

The freight car walls and floor are made up of prefabricated metallic nailable sections, or units, each provided with a novel structural means for connecting the same so that each section, or unit, when arranged to form a freight car wall or floor, will present an inner face which is in flush coplanar relation.

FIG. 1 discloses an interior view of a freight car constructed in accordance with this invention. This freight car comprises oppositely disposed walls 11 and 12 made up of a plurality of prefabricated wall forming sections. A nailable flooring 13 is shown having nail receiving grooves 14 in complementary relation with nail receiving grooves 15 formed throughout the walls 11 and 12. This nailable flooring 13 may be of the construction, configuration and arrangement as shown and described in my copending application, Serial No. 85,695, now Patent No. 3,102,613.

The side walls 11 and 12 each comprise a plurality of prefabricated self-supporting wall sections as shown in FIG. 2. These wall sections 16 each comprise an intermediate core sheet 17 which is formed to present throughout its longitudinal length a series of nail receiving grooves 18.

These nail receiving grooves 18 are formed by having the sheet 17 constructed so as to provide a substantially triangularly shaped impression having a base 19 which extends in a parallel direction to the surface of the sheet 17. The opposite legs 20 of such triangularly shaped impression converge to provide a restricted throat 21 for retaining the nail or the like inserted in the nail receiving groove 18. A suitable filler material 22 may be placed within the nail receiving groove 18, as shown.

The opposite edges of each of the core sheets 17 are so formed as to provide only one complementary leg 23 for each of the endmost nail receiving grooves 18. Each core sheet 17 is provided along one edge with a connecting end core sheet 24 which has one edge thereof formed to provide the opposite complementary leg 25 for such end nail receiving groove 18, such as the extreme right-hand groove as seen in FIG. 2.

The opposite free edge of this end core sheet 24 provides a connecting leg 26 bent inwardly in a substantially parallel direction with respect to the endmost nail receiving groove 18.

The opposite edge of the core sheet 17 is provided with a second end core sheet 27. This second end core sheet 27, like the end core sheet 24, has one end thereof formed to provide a complementary leg 28 for forming the extreme left-hand nail receiving groove 18, as seen in FIG. 2. The opposite free edge of this second end core sheet 27 is formed to provide an open hook member 29. The complementary legs 23 and 25 as well as the opposite complementary legs 23 and 28 of the core sheet 17 and each end core sheet 24 and 27 are connected together by means of welding or the like to form the bases 19 of the extreme left and right-hand triangularly shaped nail receiving grooves 18 of the section 16, as seen in FIG. 2.

Adapted to lie in facial abutment with the bases 19 of each of the nail receiving grooves 18 of the section 16 is an outside wall member 30. One end of this wall member 30 is bent at right angles with respect to its longitudinal length so as to provide a connecting shoulder 31 that extends in the direction of the interior of the car and which is in spaced parallel relation with respect to the hook member 29 of the next complementary core sheet 17. The opposite end of the wall member 30 is angled in a like direction and is provided with a foot 32 which is adapted to lie in facial abutment with the inner face of the end core sheet 24 as seen in FIG. 2. The foot 32 may be spot welded as at 33 to the inner face of the end core sheet 24.

In constructing the walls 11 and 12 of the freight car, the prefabricated wall sections 16 are constructed in accordance with the foregoing disclosure and are connected together to form a continuous wall as shown by FIG. 3.

In FIG. 3 it is seen that the connecting leg 26 of one of the end core sheets 24 is inserted into the hook 29 of the opposite end core sheet 27 of the next succeeding wall section. The connecting shoulder 31 of the one end of the outer wall member 30 lies in facial abutment with the inwardly extending portion 34 of the opposite end of the outer wall member 30. The complementary outer wall members 30 may be then connected by a continuous weld 35 extending throughout the longitudinal length of each wall section. The connecting leg 26 and the hook 29 may likewise be fixedly connected together by a continuous weld 36.

Referring to FIG. 5, I show a complementary detailed sectional view taken through the side of the freight car. I show a wall section 16 having mounted on the exterior thereof the outer wall member 30. The wall section 16 rests upon a bottom sill angle member 37 which extends the full length of the freight car and which defines the outer lower corner of the same. The nailable floor 13 is carried by such sill member 37 as shown. The outer face of each of the wall sections 16 are swaged inwardly as at 38 to provide clearance for the sill member 37. The outer wall member 30 extends downwardly over a portion of the outer face of the sill member 37 and is welded thereto as at 39. The upper longitudinal corners providing the connection between suitable roof panels 40 and the top edge of the wall sections 16 are defined by an upper angled side plate 41.

This upper angled side plate 41 is adapted to extend over the outer face of a portion of the outer wall member 30 as seen in FIG. 5. A weldment strip 42 is spot welded to the exterior surface of the outer wall member 30 and has its upper edge welded to the depending end of the upper side plate 41. The inner top end of each of the wall sections 16 may have a welded mold connection 43 to the inner surface of the upper side plate.

By the foregoing description it is apparent that through the use of the prefabricated wall sections 16, I provide a freight car that has eliminated the necessity of providing a frame supporting structure comprising vertically disposed supporting posts upon which normally is connected the inner and exterior wall members of a freight car. Each of the wall sections 16 through the presence of the nail receiving grooves 18 are self-supporting when disposed in vertical relation with respect to each other, and each wall section 16 when connected together in the manner described presents a flush interior wall which is entirely new in the respect that not only can it be used as is, but can be employed to nailably receive freight retaining and positioning members without materially affecting the construction of the freight car. In a freight car constructed in accordance with this invention there is required only the employment of door posts 44 which define the door receiving opening for such freight car. In constructing the door opening I provide two spaced apart vertically extending door posts 44 on either side of the opening. The innermost door post 44 has one longitudinal corner thereof disposed in facial abutment with the connecting leg 26 of one end core sheet 24. The two door posts 44 have disposed therebetween a spacing member 45 formed to provide a nail receiving groove 18.

This spacer member 45 is provided with angled ends 46 and 47 adapted to be welded to opposite corresponding corners of the door posts 44 in a manner so as to provide with them a flush interior wall surface. The outer faces of each of the door posts 44 as well as the outer surfaces of the base 47 of the nailable groove 18 of the spacer 45 is connected to a door stop 48. This door stop 48 extends from the lower edge of the top side plate 41 down to and rests upon an angled threshold plate 49. This threshold plate 49 is seated upon a cutout portion of the sill member 37 and has its inner edge seated within a notched out portion 50 of the floor 13 as seen in FIG. 4. It should be noted that a lower portion of the door post 44 is swaged as at 51 to clear the sill angle 37.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A prefabricated nailable panel for use in construction of a wall and the like comprising an inner and outer continuous sheet of metallic material with the outer sheet providing a substantially flush wall surface,
   (a) said inner sheet having a load-engaging wall surface provided throughout its longitudinal length with spaced apart parallelly extending grooves substantially triangular in cross section,
   (b) said grooves having their vertical angles open and interrupting the load engaging wall surface of said inner sheet,
   (c) a portion of the opposite walls of each of said triangularly shaped grooves between said inner sheet and said outer sheet and adjacent to their open vertical angle crimped in the direction of each other to provide therebetween a restricted nail receiving and retaining passage,
   (d) said outer sheet of material connected to and extending between the base portion of each of said triangularly shaped grooves throughout the length and width of said inner sheet so as to space its substantially flush wall surface from said load engaging wall surface of said inner sheet a distance substantially equal to the depth of said grooves, and
   (e) means provided by the sheets of each panel for connecting the longitudinal edges thereof to corresponding longitudinal edges of adjacent panels to provide an all nailable self-supporting load bearing wall.

2. A prefabricated nailable panel for use in construction of a wall and the like comprising an inner and outer continuous sheet of metallic material with the outer sheet providing a substantially flush wall surface,
   (a) said inner sheet having a load engaging wall surface provided throughout its longitudinal length with spaced apart parallelly extending grooves substantially triangular in cross section,
   (b) said grooves having their vertical angles open and interrupting the load engaging wall surface of said inner sheet,
   (c) a portion of the opposite walls of each of said triangularly shaped grooves between said inner sheet and said outer sheet and adjacent to their open vertical angle crimped in the direction of each other to provide therebetween a restricted nail receiving and retaining passage,
   (d) said outer sheet of material connected to and extending between the base portion of each of said triangularly shaped grooves throughout the length and width of said inner sheet so as to space its substantially flush wall surface from said load engaging wall surface of said inner sheet a distance substantially equal to the depth of said grooves, and
   (e) the corresponding ends of each of the outer and inner sheets being offset laterally with respect to each other when said outer sheet is connected to and extends between said base portions of each of said triangularly shaped grooves,
   (f) said offset end portions of each of said sheets providing means for interlocking the longitudinal edges of adjacent panels together to provide a nailable self-supporting load bearing wall.

3. A prefabricated nailable panel for use in construction of a wall and the like comprising an inner and outer continuous sheet of metallic material with the outer sheet providing a substantially flush wall surface,
   (a) said inner sheet having a load engaging wall surface provided throughout its longitudinal length with spaced apart parallelly extending grooves substantially triangular in cross section,
   (b) said grooves having their vertical angles open and interrupting the load engaging wall surface of said inner sheet, (c) a portion of the opposite walls of each of said triangularly shaped grooves between said inner sheet and said outer sheet and adjacent to their open vertical angle crimped in the direction of each other to provide therebetween a restricted nail receiving and retaining passage, (d) said outer sheet of material connected to and extending between the base portion of each of said triangularly shaped grooves throughout the length and width of said inner sheet so as to space its substantially flush wall surface from said load engaging wall surface of said inner sheet a distance substantially equal to the depth of said grooves, and (e) said outer sheet of each panel having its opposite longitudinal edges formed to provide first and second end flanges with said first end flange being of a length substantially equal to the depth of said grooves and providing a laterally extending shoulder connected adjacent to a corresponding longitudinal edge of said inner sheet, (f) said inner sheet of each panel having one corresponding longitudinal edge formed to provide a leg member of a length less than the depth of said grooves, (g) the opposite longitudinal edge of said inner sheet of each panel formed to provide a hook member, (h) said leg member provided by said one longitudinal edge of said inner sheet of one panel being engaged in said hook member provided by said opposite longitudinal edge of an adjacent panel and said first end flange provided by said outer sheet of said one panel connected in facial abutment with the second end flange of said adjacent panel for connecting the inner and outer sheets of the adjacent panels together in a vertical coplanar relation so as to form a self-supporting load bearing wall.

4. A prefabricated nailable panel for use in construction of a wall and the like comprising an inner and outer continuous sheet of metallic material with the outer sheet providing a substantially flush wall surface, (a) said inner sheet having a load engaging wall surface provided throughout its longitudinal length with spaced apart parallelly extending grooves substantially triangular in cross section, (b) said grooves having their vertical angles open and interrupting the load engaging wall surface of said inner sheet, (c) a portion of the opposite walls of each of said triangularly shaped grooves between said inner sheet and said outer sheet and adjacent to their open vertical angle crimped in the direction of each other to provide therebetween a restricted nail receiving and retaining passage, (d) said outer sheet of material connected to and extending between the base portion of each of said triangularly shaped grooves throughout the length and width of said inner sheet so as to space its substantially flush wall surface from said load engaging wall surface of said inner sheet a distance substantially equal to the depth of said grooves, and (e) the corresponding ends of each of the outer and inner sheets being offset laterally with respect to each other when said outer sheet is connected to and extends between said base portions of each of said triangularly shaped grooves, (f) said outer sheet of each panel having its opposite longitudinal edges formed to provide first and second end flanges with said first end flange being of a length substantially equal to the depth of said grooves and providing a laterally extending shoulder connected adjacent to a corresponding longitudinal edge of said inner sheet, (g) said inner sheet of each panel having one corresponding longitudinal edge formed to provide a leg member of a length less than the depth of said grooves, (h) the opposite longitudinal edge of said inner sheet of each panel formed to provide a hook member, (i) said leg member provided by said one longitudinal edge of said inner sheet of one panel being engaged in said hook member provided by said opposite longitudinal edge of an adjacent panel and said first end flange provided by said outer sheet of said one panel connected in facial abutment with the second end flange of said adjacent panel for connecting the inner and outer sheets of the adjacent panels together in a vertical coplanar relation so as to form a self-supporting load bearing wall.

References Cited by the Examiner
UNITED STATES PATENTS

| | | | |
|---|---|---|---|
| 2,106,390 | 1/38 | Crane | 189—34 |
| 2,388,968 | 11/45 | Hedgren | 189—34 |
| 2,429,182 | 10/47 | Doke | 105—422 |
| 2,900,926 | 8/59 | Neuhart | 105—422 |
| 2,923,256 | 2/60 | Johansson | 105—423 |
| 2,962,130 | 11/60 | Marsi | 189—34 |
| 3,102,613 | 9/63 | Johnston | 105—422 |

EUGENE G. BOTZ, *Primary Examiner.*

LEO J. LEONNIG, LEO QUACKENBUSH, *Examiners.*